Patented Sept. 5, 1939

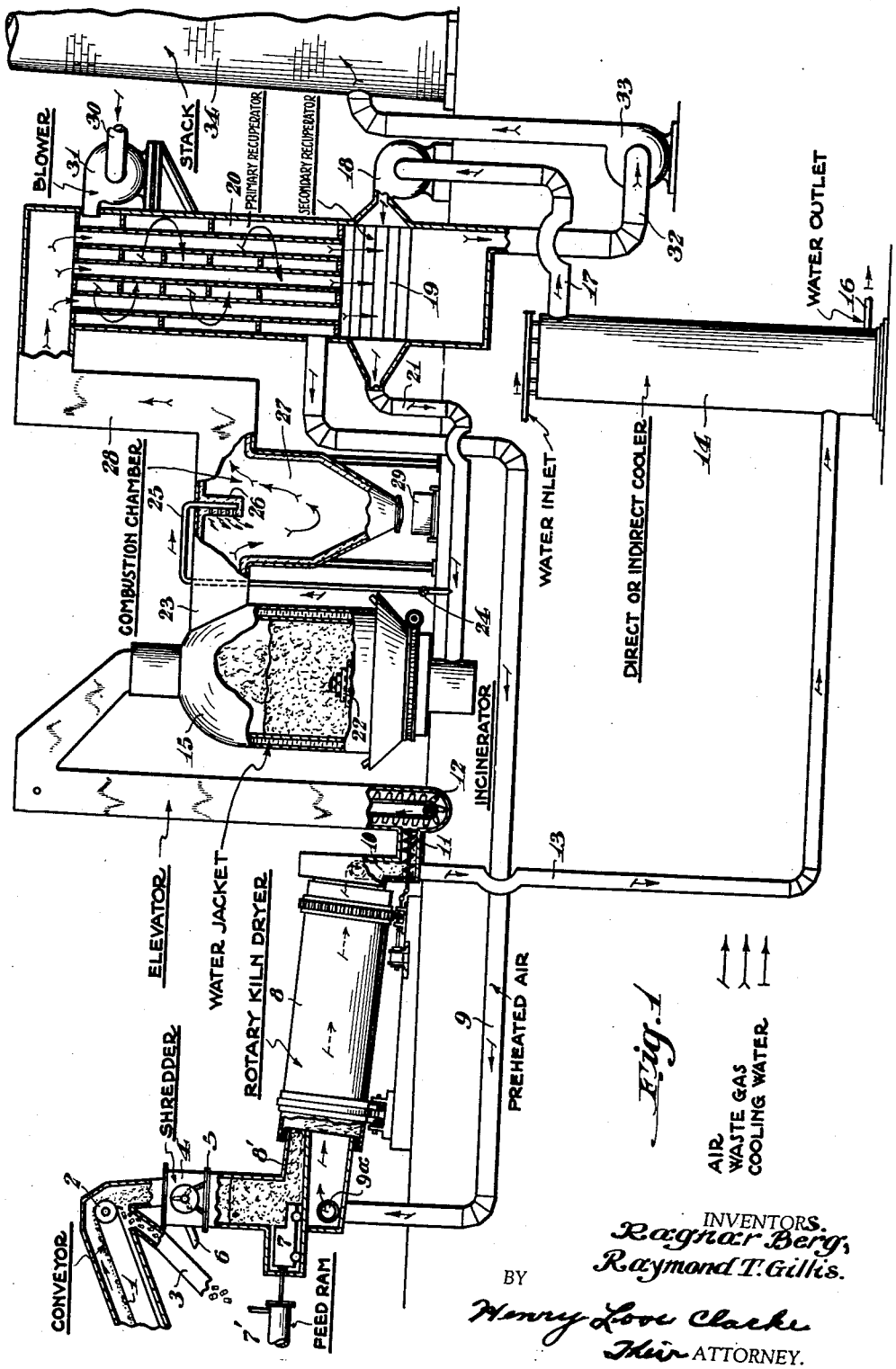

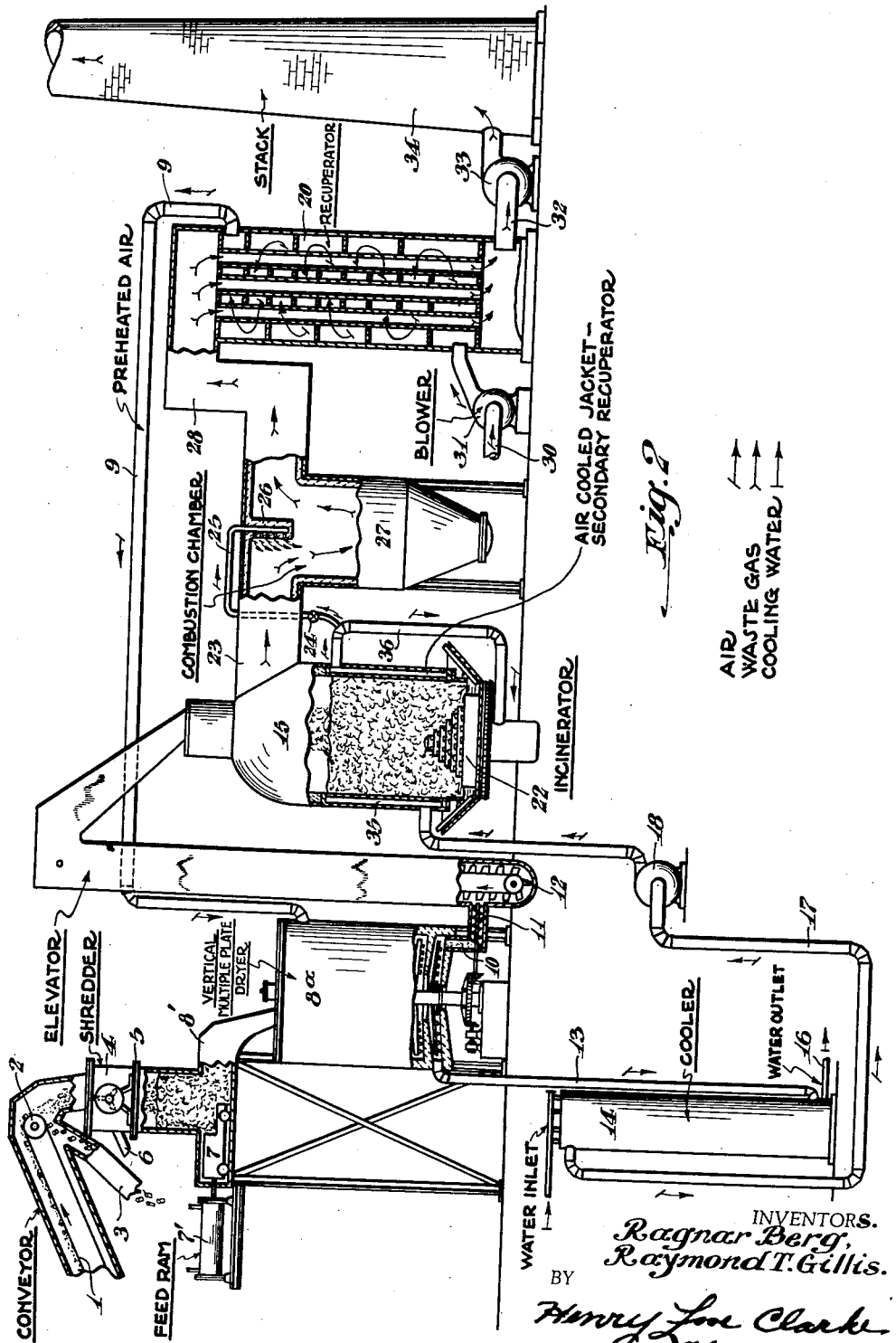

2,171,535

UNITED STATES PATENT OFFICE 2,171,535

INCINERATION OF HIGH MOISTURE REFUSE

Ragnar Berg and Raymond T. Gillis, Pittsburgh, Pa., assignors, by mesne assignments, to Charles W. Nichols, Sr., New York, N. Y.

Application March 8, 1935, Serial No. 9,940

1 Claim. (Cl. 110—8)

Our invention relates to a new and useful improvement in the disposal methods of municipal and civic refuse, and pertains particularly to the incineration of those elements of such refuse as contain high percentages of moisture, as for example, sewage sludge cake, garbage consisting primarily of animal and vegetable kitchen residues, and the like, containing above 60% water for example.

Destruction of materials of this nature by incineration has been a long-standing problem in community life. As they accumulate for disposal, the water content is so high as to almost obscure the fact that they actually contain within themselves components capable of producing relatively high combustion temperatures, if properly utilized.

Incineration of such elements of refuse is highly desirable for many considerations hygienic, esthetic and economic; and high temperatures of incineration are important as a deterrent to propagation of infectious disease, elimination of malodorous situations and production of a substantially combustible-free residue.

In the prior art, sundry methods have been advanced and used to achieve these ends. Substantial amounts of fuels of various types such as coal, coke, fuel oil, etc., have been added to the refuse for the purpose of assisting combustion, which practice constitutes an economic disadvantage; mechanical means have been proposed for the elimination of sufficient moisture to facilitate combustion, which are too costly in first installation and which also by reason of high power consumption and the ease of damage to such equipment by the presence of non-compressible objects such as stones, tramp iron, etc., also is an added expense to any incineration method using it.

Dry garbage, sewage sludge and related materials have a relatively high calorific value, varying from 7,000 to 12,500 B. t. u. per pound. The calorific value naturally varies with the composition, which is a factor changing with season and geographical position. Materials with the aforementioned content in heat units are readily ignitable, support combustion actively and constitute, in the dry condition, a reasonably good fuel capable of developing relatively high temperatures in their products of combustion. In the raw material, however, these potential combustion characteristics are so masked by inerts and high percentages of water, the moisture comprising often 80% or more of the total, that the contacting of the oxygen of the draft air with the combustible components is in practice impossible; and it is therefore necessary, before satisfactory incineration of such materials can be brought about, which will produce sufficiently high combustion temperatures to destroy obnoxious odors that are formed at lower combustion temperatures, that some means be taken to remove sufficient of this inherent moisture to permit establishment of proper contact between the draft air and the combustible. Such moisture reduction has been effected "in situ" in incinerators during the combustion period both by adding highly combustible materials to the mixture of raw refuse, as well as by burning in an adjacent or segregated section of the incinerating device, fuels such as coal or gas, the hot combustion products of which were passed over the raw refuse as it lay on the grate to assist in its drying and ultimate burning. Mechanical pressure has also been resorted to in attempting to reduce the moisture content of the raw refuse to such amounts of moisture that when the original raw refuse, partially dehydrated in this manner, was introduced into the combustion zone of the incinerator proper, easy and rapid combustion would follow.

Supplementing the potential heat content of the raw refuse by any additional heat units is not only costly but unnecessary in most cases by the application of our invention, since by a partial drying of the raw refuse before its introduction into the combustion zone, we have demonstrated, that active combustion with sufficiently high temperatures in the products of combustion will be produced, such that they alone can be employed to effect the necessary partial drying of incoming raw refuse without additional heat being added, if proper distribution and application of the available heat is effected in different steps of the process.

Mechanical methods of pressing the raw refuse have not been satisfactorily demonstrated as capable of reducing the moisture content in the wet refuse containing, for example 82% moisture to a product containing below about 55% moisture, which is desirable for the effectiveness of the incineration step.

Our invention, therefore, has for its object method and means by which raw refuse of high moisture content such as garbage, sewage sludge cake and the like containing above 60% water, for example 82% water, can be utilized to effect its own destruction through novel use and application of its available heat units; and in such manner as to produce a heat balance such that monetary outlay for supplemental fuel for additional heat and expensive dehydration devices, can be substantially avoided. In extreme cases, where by nature the combustible elements in a refuse are of low heating value because of their chemical constitution some additional fuel may be required, but in the hereinafter described process such additions will be reduced to a minimum.

Our invention has for a further object the substantially complete elimination of all noxious and nuisance odors often accumulating in the vicinity of incinerators not properly designed or operated, by maintaining high temperatures in the exhausted combustion gases; and the passage through the hot combustion zone of all air used in a partial drying stage for the preparation of the raw refuse for subsequent incineration. The invention has for further objects such other improvements, advantages or results in construction or operation as may be found to obtain in the processes or apparatus hereinafter described or claimed.

In accordance with our invention, refuse of the aforedescribed nature passes over a mechanical device whereby metallic particles are removed by magnetized elements. Thereafter, depending upon the type of material being treated, follows a shredding operation which has for its object the reduction in size of the material when necessary, but primarily the production of a homogeneous mixture both as to size and distribution of the moisture through the mass. A partial drying follows the reduction in size and homogenization of the raw material, wherein it is brought into preferably con-current contact with air which has been highly preheated by waste-gases produced by the incineration of partially dried refuse, which has previously passed through the drying stage. The air highly preheated in a recuperator transfers some of its heat content to the moist refuse and causes a partial evaporation of the moisture content; the water so eliminated passes from the drying device in the vapor phase admixed with the air used for drying. The drying air is thereby much reduced in temperature. The air and water vapor mixture then passes to a cooling device, of direct or indirect type, where it is further reduced in temperature.

This cooling stage is an important feature in the thermal economics of our process. Inasmuch as the air which has been used for the drying operation later passes to the combustion chamber to serve as the source of oxygen supply for the incineration or combustion reaction, a substantial removal of its water-vapor content is highly important, in view of the rather limited calorific values at the disposal of the process. The cooling operation at this stage, therefore, eliminates the heat losses which would be experienced by conducting that water-vapor removed from the dryer, directly to the combustion chamber, where of necessity it would be heated to the temperature of the combustion products eliminated from the system. Within the cooler substantially complete elimination of the water evaporated in the drying stage is effected, and the combustion-air with a greatly reduced dew point passes by way of a secondary reheater of any preferred design, to the burning zone or incineration step. Within this zone, the now reheated air and partially dried refuse are burned with the production of high temperatures and the substantially complete elimination of all combustible materials from the ashy residue. The gaseous products of combustion pass from the combustion chamber to a recuperator where they preheat any air which is passing to the drying stage, and in one form of the invention, also the air passing from the condenser to the burning zone.

The use of the same air for the drying and then as the combustion medium makes possible the conversion of all malodorous constituents which may have been volatilized in the dryer, into inoffensive end products.

In the accompanying drawings forming a part of this specification and showing for purposes of exemplification a preferred form and manner in which the invention may be embodied and practiced but without limiting the claimed invention specifically to such illustrative instance or instances.

Figure 1 is an elevational view partly in vertical cross section of a plant lay-out for incinerating high moisture refuse in accordance with our invention; and Figure 2 is a similar view of a modified form embodying the invention.

The same characters of reference designate the same parts in each of the drawings.

Referring to Figure 1, the raw high moisture refuse such as garbage or sewage sludge cake to be treated is introduced into the processing system from a receiving hopper therefor by means of conveyor belt 1 and arrives at magnetized pulley 2 where constituents such as cans, nails, and other magnetically sensitive materials are removed, and are set to chute 3. From magnetic pulley 2, the refuse passes to a suitable shredder 4, as for example, of the hammer-mill type where the material is reduced to such size that it will pass through a 3" screen. Provision may be made in the shredder for the elimination of stones, non-magnetic metals and such other materials as cannot be reduced to pass through the bar-grate situated at 5 (not illustrated) and these may be discharged from the device at such point as outlet 6. Obviously, in those cases where the raw material to be incinerated is known to contain no metals or solids requiring removal and is also of the preferred size and homogeneity in its composition, as is for example the case where sewage sludge cake is incinerated alone, the steps in our invention comprising a magnetic separation and a shredding may be omitted.

The shredded refuse containing the original quantity of moisture is forced by plunger feeder 7 operated by an hydraulic cylinder 7' into the refuse inlet 8' of the rotary dryer 8 where it comes into direct contact with highly preheated air which is to be later used for the combustion of the refuse to incinerate it after the refuse has been predried or partially dehydrated by the air. The air may flow either con-currently or counter-currently to the refuse. Our preferred arrangement is for the air to flow con-currently. The highly preheated air arriving from a further step in the system through pipe 9, passes through outlet 9a and into the rotary dryer 8 where, as it passes over the moist refuse in direct contact, it causes the evaporation of a high percentage of the moisture, and is greatly reduced in temperature.

The partially dried refuse and warm air laden with moisture leave dryer 8 at outlet 10, the refuse being transported by the screw-conveyor 11 to bucket elevator 12, while the warm air passes through pipe 13 to the bottom of the cooler 14. Between the dryer 8 and the cooler 14, a dust catcher preferably of the cyclone type may be installed for the removal of any suspended materials carried by the air. The bucket elevator 12 lifts the partially dried refuse to the top of the elevator shaft where it is discharged into the incinerator 15, which may be of any conventional design, and where it is burned. In those installations where large quantities of material are burned, we prefer to use the Koppers automatic incinerator, which is provided with a revolving eccentric grate which agitates the charge and automatically discharges the ashy residue. It is provided with either a water or air cooled jacket to obviate the possibility of clinker formations accumulating on the incinerator side-walls. The jacket may also be cooled in one part by air and another by water in such cases as it is desirable to have a source of available steam supply. In this Figure 1, the jacket is water-cooled.

The warm air from the dryer 8, which enters cooler 14 by means of pipe 13 and which may be of either the direct or indirect type, is cooled by water whereby a substantial percentage of the moisture which has previously been evaporated in the dryer is precipitated out and flows from the cooled air cooler at outlet 16 for disposal. The cooled air passes through pipe 17 and either flows or may be conveyed by fan 18 into the secondary recuperator 19, (which for purposes of illustration are designated by horizontal conduit lines in the drawings), where it is reheated to an intermediate temperature by the combustion gases from the incinerator 15 which have previously passed through the primary recuperator 20. The reheated air then passes by means of pipe 21 to the grate of the incinerator 15 and is distributed through the burning refuse by the openings in the grate 22. The hot gaseous products of combustion rise through the fuel-bed and flow from the incinerator 15 through the connection 23, where they meet a current of secondary air which is introduced from pipe 21 by means of valve 24 and pipe 25, through the baffle-wall 26 into the combustion chamber 27, and through which sufficient air is introduced to insure that complete combustion has taken place and all volatile matter destroyed before the waste gases pass through flue 28 into the primary recuperator 20. The combustion chamber 27 may serve not only as a dust-catcher but as a sterilizer for tin cans which may periodically be discharged into the car 29 and disposed of.

The hot gases of combustion pass from flue 28 into the primary recuperator 20, where they give up a portion of their heat content to fresh air that is brought through pipe 30 and fan 31 into the recuperator. This air is heated to a high temperature as it flows by proper baffling through the primary recuperator which it leaves through pipe 9 and passes into the dryer 8 to evaporate moisture from new quantities of raw refuse. The combustion gases reduced in temperature then flow from the primary to the secondary stage of recuperation in 19 and eventually pass through pipe 32, either with or without the use of induced draft as by fan 33, into the stack 34, from which they are discharged into the atmosphere odorless and inoffensive.

In Figure 2, a modified embodiment by which our invention may be practiced, is shown. The vertical multiple tray dryer 8a of the Hereschoff type may be substituted for the rotary kiln type dryer 8, while reserving the con-current flow of hot drying air and moist refuse.

The cooled air for combustion upon leaving the cooler 14 may, instead of being reheated in the secondary recuperator 19, pass into the jacket 35 of the incinerator, where simultaneous cooling of the incinerator walls and the secondary recuperation or preheating of the combustion air may be effected; in this case the use of water in the jacketed walls may be either entirely or only partially eliminated as preferred. Such modification is illustrated in Figure 2 by showing the air flowing from fan 18 into the incinerator wall jacket 35 and thence through pipe 36, through the openings in the grate 22 into the combustion zone of the incinerator. Obviously, reheating of the combustion air in the walls of the incinerator may eliminate the necessity of using a secondary recuperator.

The preheating of the air in the primary recuperator may follow a con-current flow as shown in Figure 1 or counter-current flow as illustrated in Figure 2, before it passes to the dryers 8 or 8a.

As aforementioned, to accomplish the most economical results in our invention, substantial apportioning of the limited heat units available in the raw refuse must be made to each step of the process. Comprehensive investigation and operating experience show that refuse of the aforedescribed nature and containing for example as high as 82% moisture treated in accordance with the present invention may be dried to a moisture content of less than 55% by novel utilization of the heat of the products of combustion, and that combustion of such partially dried refuse will yield waste gases entering the primary recuperator at approximately 2300° F. The air for combustion enters the recuperator 20 while cold at atmospheric temperature (for example 60° F.) and after preheating therein to approximately 1600° F. the air passes from the recuperator to the drying stage, and the waste gases may leave the primary recuperator at temperature reduced from about 2300° F. to approximately 1150° F.

In the drying step the preheated air is made to evaporate a large amount of the moisture contained in the raw refuse, the volume and time of contact of air and refuse preferably being so arranged that the refuse leaves the drier containing only about 55% moisture.

The moisture laden air leaves the dryer reduced from approximately 1600° F. to about 190° F. with a dew point of 166° F. In the condenser cooler 14, this temperature is further reduced to about 90° F. or less saturated, and in so doing about 0.55 lb. of moisture is removed per pound of raw refuse, assuming that the moisture content of the refuse had been reduced from 82% to less than 55% in the drier and that 50% excess air had been used. The removal of this large amount of moisture makes possible the production of much higher combustion temperatures than would have resulted had the moisture passed to the incinerator in vapor form to be heated to the combustion temperature. The result is, therefore, an important economy of the available heat of the raw refuse.

The air from the condenser cooler may be fed directly into the base of the incinerator, especially when the moisture content is much lower than 55%, but when the preliminarily partially dried refuse has, for example a moisture content of 30% to 55% it is found advantageous to preheat the air prior to introducing it into the incinerator. In such case, the air leaving the condenser cooler at 90° F. or less is then conveyed by a fan either to the jacketed walls of the incinerator or to a secondary recuperator where it is heated to approximately 500° F. before entering the incinerator to promote combustion.

The invention as hereinabove set forth is embodied in particular form and manner but may be variously embodied within the scope of the claim hereinafter made.

We claim:

An apparatus for the incineration of combustible residues of high moisture content comprising, in combination: a dryer; a cooler; an incinerator device embracing a stationary shell, and revolving ash pan with attached perforated and eccentric conical grate through which combustion air is introduced into the burning zone for continuous discharge of ash during concurrent diffusion of the combustion air through the fuel bed during agitation thereof, and a secondary combustion chamber for off-flow of the incinerator gases from the incinerator; incineration-gas off-flow conduit-means including a primary and a secondary recuperator communicably connecting said secondary combustion chamber with a stack for off-flow of substantially all of the incinerator gases from the secondary combustion chamber through the recuperators to the stack; and combustion-air inlet-means for introducing combustion air to the incinerator; the incineration-gas off-flow conduit means being adapted for off-flow of substantially all of the incineration gases through the recuperators to the stack out of heat exchange relation with the dryer, and the combustion-air inlet-means for the incinerator being so designed and adapted with respect to the incinerator as to require substantially the total combustion air requirement for the incinerator to first flow in series through the primary recuperator, the dryer, the cooler and then the secondary recuperator before entering the combustion zone and secondary combustion chamber of the incinerator.

RAGNAR BERG.
RAYMOND T. GILLIS.